UNITED STATES PATENT OFFICE.

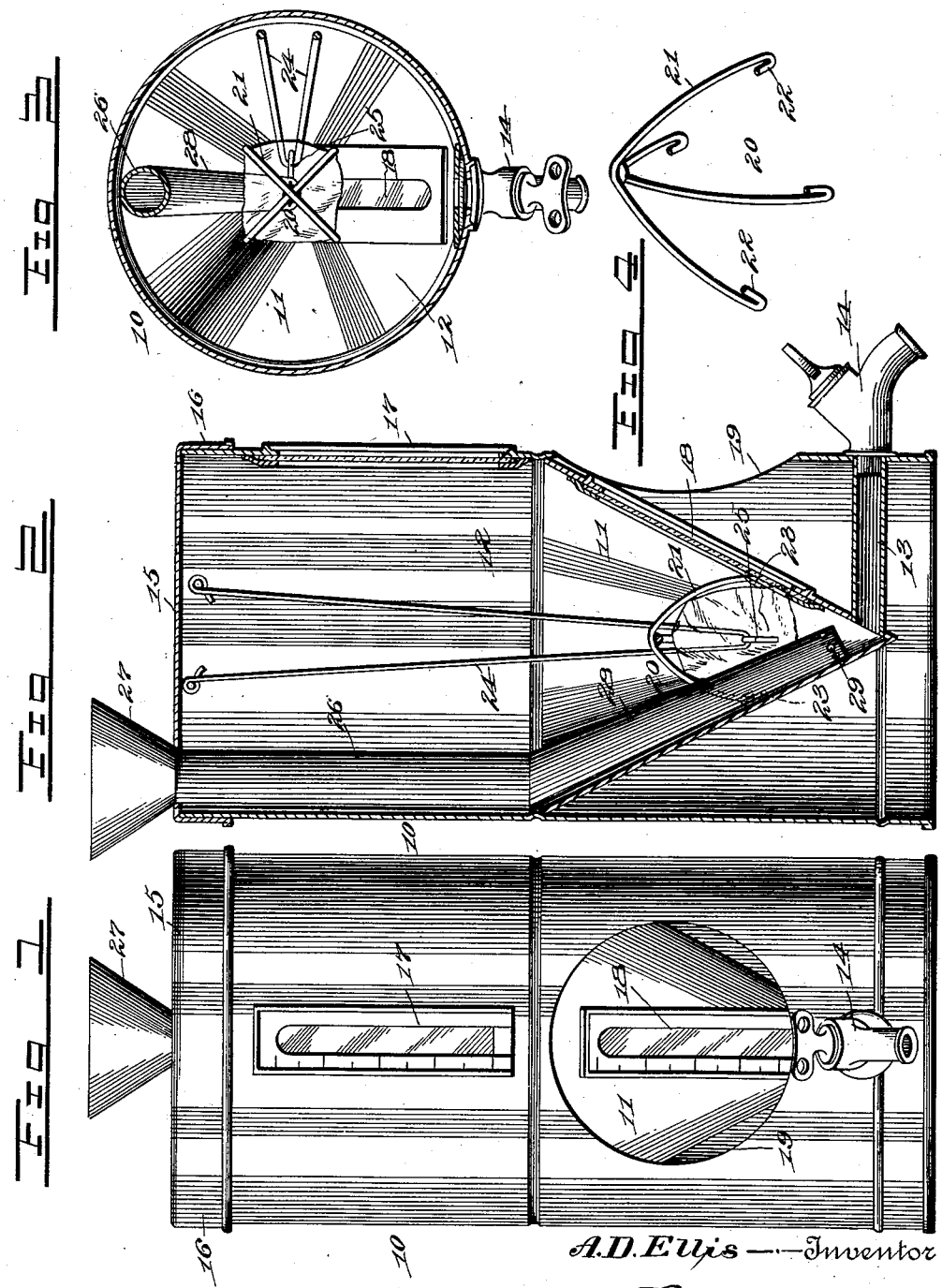

AZRO D. ELLIS, OF MINNEAPOLIS, MINNESOTA.

CREAM-SEPARATOR.

SPECIFICATION forming part of Letters Patent No. 697,613, dated April 15, 1902.

Application filed May 22, 1901. Serial No. 61,427. (No model.)

*To all whom it may concern:*

Be it known that I, AZRO D. ELLIS, a citizen of the United States, residing at Minneapolis, in the county of Hennepin and State of Minnesota, have invented a new and useful Cream-Separator, of which the following is a specification.

The present invention relates to cream-separators, and particularly to that class in which water is employed for the purpose of separation by being poured directly into the milk. In separators of this class it is desirable that the water be as cold as possible in order to effect a rapid and a thorough separation, and it is furthermore desirable that this cold water be introduced beneath the body of the milk in order to obtain the best results.

The principal object of the present invention is to provide means whereby the inflowing water is projected directly against ice, which also serves to maintain the mixture at a much lower temperature than has heretofore been attainable. In the following specification there is described the preferred means for accomplishing this object, said means being also shown in the accompanying drawings. It will be understood, however, that such changes from the construction shown and described may be made as are within the scope of the claim hereto appended.

In the drawings, Figure 1 is a view in elevation of the improved separator. Fig. 2 is a longitudinal sectional view of the same. Fig. 3 is a horizontal cross-section, and Fig. 4 is a perspective view of the ice-holding basket detached.

Similar numerals of reference designate corresponding parts in the several figures of the drawings.

In carrying out the invention as shown in the accompanying drawings a tubular casing 10, preferably circular in cross-section, is provided, having an intermediate inverted-cone-shaped partition 11, whereby a receptacle 12 is provided, said partition 11 forming the bottom thereof. From the apex of the bottom 11 extends a discharge-pipe 13, that extends through the tubular casing 10 and is provided with an exterior cock or faucet 14. This discharge-pipe 13 therefore also serves as a brace between the apex of the bottom and the wall of the casing. The upper end of the receptacle 12 is closed by a preferably flat cover 15, having an annular peripheral flange 16, that fits over the upper edge of the casing and retains said cover in place. The side wall of the receptacle 12 and the bottom 11 are provided, respectively, with sight-openings 17 and 18, covered with glass or other suitable transparent substance, and the casing 10 is cut out, as at 19, to permit of a view through the sight-opening 18.

For the purpose of holding ice in the lower part of the receptacle a cage 20 is made of crossed curved wires 21, secured together at their points of intersection and having hooks 22 at their terminals, which are arranged to be interlocked with hooks 23, secured to the bottom of the receptacle. In use the ice is placed in the bottom of the receptacle, and the basket is arranged over the same and secured to the bottom, thus holding said ice in place when the milk is poured into the receptacle. There is also illustrated other ice-holding means which are especially useful if it is desired to insert the ice after the milk has been poured into the receptacle. This means is in the shape of a flexible wire or cord 24, that passes through an eye 25, located at the lower end of the receptacle, said wire or cord having its ends located contiguous to the upper end of the receptacle and secured thereto by suitable means. When it is desired to lower the ice to the bottom of the receptacle, said ice is secured to one end of the flexible holder and the other end is drawn upwardly until the ice is in proper position, when the holder may be fastened.

In connection with the ice-holding means there is employed a device for injecting water at the bottom of the body of milk and against the ice. This device comprises a supply-tube 26, that passes through an opening in the cover 15 and has an exposed funneled end 27. The lower end of the tube is provided with an offset tapered nozzle 28, that lies alongside of the bottom and has its lower end closed. Said lower end is provided with an annular series of discharge-orifices 29, that are thus located in the apex of the bottom 11.

The operation of the device will be apparent. The milk is placed in the receptacle either before or after the ice has been placed therein, as above described, said ice being above the discharge-orifices of the water-supply pipe, as shown in Fig. 2. The water is then poured into the receiving-funnel of the supply-pipe and will gravitate to the bottom of the tube, pass through the discharge-orifices, and impinge against the ice. It will thus be thoroughly chilled before coming into contact with the milk, and the body of water will be maintained at a low temperature by reason of the ice contained therein. By actual use it has been found that not only is the separation greatly accelerated, but that a greater percentage of cream is obtained and a less amount of water is necessary, so that the milk will not be diluted to the extent necessary in separators of this class as ordinarily constructed.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

In a cream-separator, the combination with a receptacle, of a water-supply pipe located at one side of the receptacle, and having its discharge end arranged in the lower end thereof, eyes secured to the receptacle above the discharge end of the water-supply pipe, and an ice-holding cage located in the receptacle above the discharge end of the supply-pipe, and comprising cross-wires having terminal hooks that detachably engage the eyes.

In testimony that I claim the foregoing as my own I have hereto affixed my signature in the presence of two witnesses.

AZRO D. ELLIS.

Witnesses:
G. R. WILLIAMS,
G. H. TOBEY.